March 26, 1940.     D. McDONALD     2,194,862
VAPOR CONTROL
Filed May 3, 1937

INVENTOR.
Dan McDonald

Patented Mar. 26, 1940

2,194,862

UNITED STATES PATENT OFFICE 2,194,862

VAPOR CONTROL

Dan McDonald, Los Angeles, Calif., assignor to Engineering Incorporated, Los Angeles, Calif., a corporation of California Application May 3, 1937, Serial No. 140,448

10 Claims. (Cl. 68—20)

This invention is a means for directing vapors through material so as to insure intimate contact, and is particularly applicable and therefore will be described with reference to dry-cleaning apparatus, the invention providing for directing vapors through material contained in a rotatable cage, for the purpose of evaporating solvent in which the material has been dry-cleaned.

It is an object of the invention to direct the vapors into that sector of the cage in which the material collects during rotation of the cage, so as to insure penetration and passage of all of the vapors through the material with no possibility of a portion of the vapors entering and being withdrawn from the cage without having passed through the material.

More particularly it is an object of the invention to direct vapors through a plurality of circumferentially spaced supply conduits which are associated with the rotatable cage, so that vapors are supplied via each conduit only while it is passing through that arc of rotation at which material collects.

It is a further object of the invention to automatically control the vapor supply, for discharge via each conduit while it is passing through the arc of rotation at which material collects, and for shutting off discharge via each conduit while passing through the remaining arc of rotation which is above the collected material.

It is a still further object of the invention to control the vapor supply so that irrespective of the direction of rotation of the cage, each conduit will supply vapors while passing through the material collecting arc as determined by the direction of rotation.

It is a still further object of the invention to automatically adjust the vapor supply control in accordance with reverse rotation of the cage.

Further objects of the invention will be readily understood from the following description of the accompanying drawing, in which.

Figure 1:
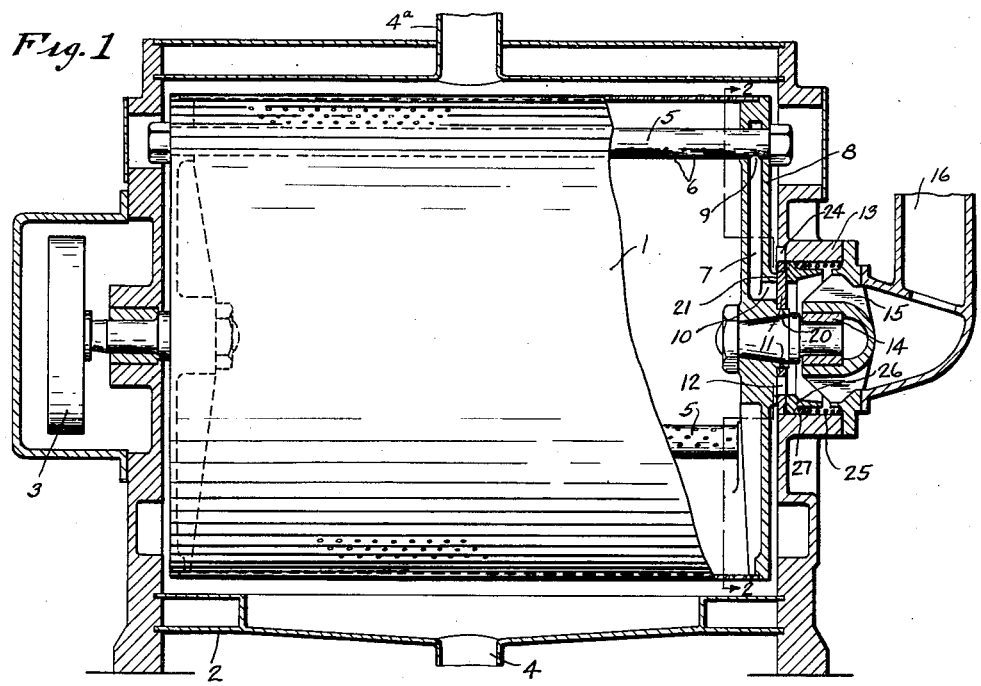
Fig. 1 is an axial section through dry-cleaning apparatus provided with the vapor control.

The invention provides for directing vapors into only that sector of a container in which material collects during rotation of the container, and is described in connection with dry-cleaning apparatus which includes a perforated cage 1, rotatable in a drum 2 and adapted to receive material such as garments, rags, etc. Responsive to rotation the material tumbles in the cage but as a whole collects in that sector of the cage which is at one side or the other of its lower portion, depending upon the direction of rotation. The space in which the material tumbles and collects is indicated by A—A at Fig. 2, the direction of rotation being indicated by the arrow A', and is indicated by B—B at Fig. 3, the opposite direction of rotation being indicated by the arrows B'. The cage 1 may be rotated by a pulley 3 which may be driven by any suitable drive mechanism (not shown), and in accordance with usual practice the drive mechanism may include means for periodically and automatically reversing the direction of rotation of the cage.

The apparatus may be employed for cleaning any desired material by usual dry-cleaning methods, a suitable solvent being supplied to the drum 2 through an inlet conduit (not shown), and the perforated cage 1, containing the material which is to be cleaned, being then rotated in the drum so as to immerse the material in the solvent, after which the solvent may be drained off via an outlet conduit 4, provided with a suitable valvular control (not shown).

The apparatus provides for extracting solvent which impregnates material after it has been thus dry-cleaned, and for this purpose vapors are passed through the material in the cage 1 so as to supply latent heat for evaporating remaining solvent. The vapors are then withdrawn from the drum 2, preferably via a conduit 4ᵃ, provided with a suitable valvular control (not shown); and the solvent vapors may then be regenerated for recovering the solvent for reuse. A method and apparatus for removing and recovering solvent and with which the present invention may be employed, is described and claimed in my copending application Ser. No. 59, filed January 2, 1935.

As an instance of means for passing vapors through the material, longitudinally extending circumferentially spaced conduits 5 are mounted in the cage 1 adjacent its periphery, and are ported as shown at 6 for discharging vapors into the cage.

The cage 1 is rotated during evaporation of solvent by the vapors which are supplied via the ports 6, whereby the conduits 5 provide means for engaging and moving the material in the cage; and responsive to this engagement and the force of gravity the material is agitated and tumbled, but as a whole collects in either the sector A—A or B—B, depending upon the direction of rotation.

Means are provided whereby vapors are directed through the ports 6, only while each conduit 5, turning with the rotatable cage 1, is passing through the arc of rotation A—A or B—B, depending upon the direction of rotation of the cage. Consequently all of the vapors which are discharged via the ports 6, must pass through the material collected in the sector A—A or B—B, before withdrawal via the outlet 4ª, and therefore all of the vapor is brought into intimate contact with the material. During passage of each conduit 5 through the remaining arc of rotation, above either A—A or B—B, discharge of vapor via its ports 6 is shut off so that there is no discharge of vapor into that portion of the rotatable cage which is not occupied by material.

As an instance of this arrangement the conduits 5 may be supplied with vapors via radial ducts 7 in one end plate 8 of the rotatable cage, there being a separate duct 7 communicating with each of the discharge conduits via a port 9, and the ducts 7, at their radial inner ends, open longitudinally to the exterior of the end plate 8, via ports 10. A selector disc 11 overlies the outer surface of the end plate 8 and has an arcuate slot 12, which with the cage 1 rotating relative to the selector disc is adapted for successive alinement of the ports 10 with the arcuate slot 12.

As the cage 1 rotates, each port 10 is thus uncovered throughout that arc of rotation during which the port moves along the arcuate slot 12, and throughout the remainder of the arc of rotation each port 10 is closed by the non-slotted portion of the selector disc 11. For rotation of the cage 1 in the direction indicated by the arrow A', the selector disc is positioned as shown at Fig. 2, so that its arcuate slot 12 corresponds to the segment which is defined by the arc A—A; and for rotation of the cage 1 in the reverse direction as indicated by the arrow B', the selector disc is positioned as shown at Fig. 3, with its arcuate slot 12 corresponding to the segment which is defined by the arc B—B.

Vapors are supplied via the slot 12 to the ports 10 while the latter are alined with the slot; and the vapors are thus supplied via ducts 7 to the conduits 5 during movement of each of the conduits through that arc A—A or B—B which defines the sector in which material collects in the rotatable cage. The vapor supply to the arcuate slot 12 may be via a chamber 13 which is a part of the stationary drum 2 and which encloses the outer face of the selector disc 11; and this chamber may support a bearing 14 in which the rotatable cage 1 is journaled, with passages 15 extending longitudinally through the chamber 13 in circumferentially spaced relation around the bearing 14, for passage of vapors which are supplied via a conduit 16 leading to any suitable source of vapor supply (not shown).

Figure 2:
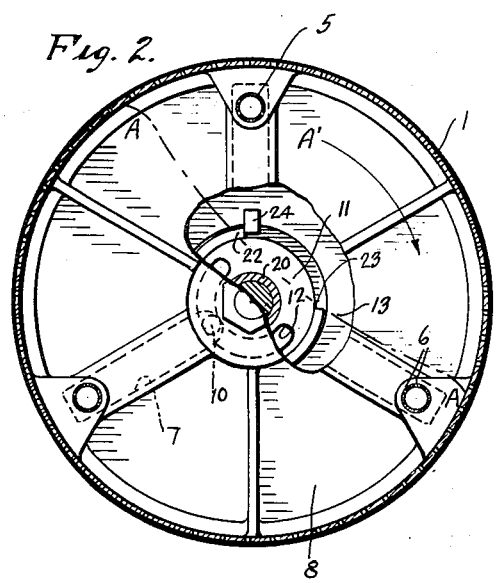
Fig. 2 is a transverse section on the line 2—2 of Fig. 1.
Figure 3:
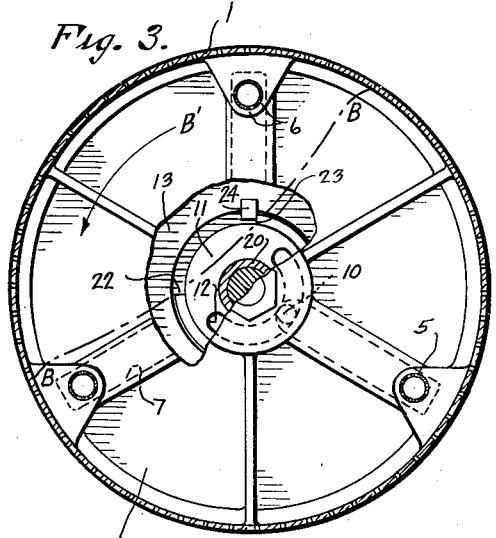
Fig. 3 is a view similar to Fig. 2, showing the relation of the parts when the cage is rotated in reverse direction.

The cage 1 is preferably adapted for automatic periodic reversal of its direction of rotation, and therefore the selector disc 11 is preferably adapted for corresponding automatic adjustment so as to assume and maintain the position shown at Fig. 2 during rotation of the cage in the direction indicated by the arrow A', and so as to assume and maintain the position shown at Fig. 3 during opposite rotation of the cage as indicated by the arrow B'. For this purpose the selector disc 11 is preferably journaled on a bearing 20 at the outer face of the end plate 8, and is adapted for frictional engagement with the end plate at cooperating friction surfaces 21, whereby this frictional engagement turns the selector disc with the rotatable cage 1 until the selector disc is in the position shown at Fig. 2 or 3, depending upon the direction of rotation of the cage, whereupon rotation of the selector disc is arrested and the frictional engagement yields to permit continued rotation of the cage, with the disc 11 maintaining its selected position until the direction of rotation of the cage 1 is reversed.

To arrest rotation of the selector disc in one or the other of its operative positions, circumferentially spaced stops 22—23 preferably project radially from the periphery of the disc, and when the disc is rotated in the directions A' or B' the stops respectively engage a cooperating abutment 24 which is associated with the stationary chamber 13, so as to arrest rotation of the selector disc when it has been turned to the positions shown at Figs. 2 and 3 respectively. The frictional engagement at the surfaces 21, and which is adapted to yield when the selector disc has been thus arrested, is preferably maintained by a spring 25. For this purpose an abutment ring 26 may engage the outer face of the selector disc 11, with the spring 25 yieldingly projecting the abutment ring. The selector disc is thus held in frictional engagement with the rotatable cage for rotation therewith until one or the other of the stops 22—23 engage the abutment 24, whereupon the spring 25 yields so as to relieve the frictional engagement at the surfaces 21 and thus permit continued rotation of the cage 1 with relation to the now stationary selector disc.

Packing is preferably provided for preventing escape of vapors around the selector disc 11, and for this purpose the abutment ring 26 may be annularly recessed for reception of packing 27 between the abutment ring and the surrounding wall of the chamber 13, and the spring 25 in addition to its function of yieldingly projecting the abutment ring 26, may exert pressure against the packing 27 for resiliently operatively expanding the same. As an instance of this arrangement the annular recess in the abutment ring 26 may form a seat for one end of the packing 27, with the spring 25 abutting the opposite end of the packing so as to resiliently longitudinally compress the packing against its seat and also yieldingly longitudinally project the abutment ring 26 against the selector disc 11.

The invention thus provides for controlling admission of vapors to the ducts 7 for discharge via the ports 6, by controlling admission of vapors from the chamber 13 to the intake ports 10 of the supply ducts, with the selector disc 11 closing each port 10 while its corresponding conduit 5 is moving through that arc of rotation which defines the sector of the rotatable cage 1 in which material does not collect, and with the slot 12 of the selector disc uncovering each port 10 while its corresponding conduit 5 is moving through that arc of rotation which defines the sector of the rotatable cage in which material collects responsive to the tumbling action produced by rotation of the cage.

Vapors are thus supplied via each conduit 5, only while that conduit is moving through the space in which the collected material surrounds the conduit, and all of the vapors discharged via the ports 6 are thus directed through the collected material, with no possibility of the vapors merely entering the cage 1 and discharging therefrom without having passed through the collected material.

The invention thus provides efficient means for insuring intimate contact of vapors with material in a container, and is thus particularly applicable for directing vapors through material which has been dry-cleaned, for evaporating residual solvent. The vapors may be vapors of the identical solvent which is to be evaporated, supplied at a temperature providing latent heat for vaporizing the residual solvent and directed through the material by connecting the supply conduit 16 to a suitable source of supply for such vapors; or steam may be similarly directed through the material for evaporating residual solvent, or for merely freshening material as a last step of a solvent extraction and drying process, by connecting the supply conduit 16 to a suitable steam supply.

I claim:

1. In combination, a container rotatable on a substantially horizontal axis and adapted for reversal of its direction of rotation, longitudinally extending circumferentially spaced conduits in the container adjacent its periphery for engaging and tumbling material in the container responsive to its rotation, whereby the material collects in the lower portion of the container at a sector which is fixed in space and which has its major portion at that side of the vertical axial plane which is in the direction of rotation of the lower portion of the container, the conduits being ported for discharge into the container, passageways turning with the rotatable container and communicating with the respective conduits and having inlet ports circumferentially spaced around the axis of the rotatable container, a closure means for the inlet ports having a control port, the closure means being journaled concentrically with the rotatable container, a friction drive for rotating the closure means for limited rotation in the same direction as the container, packing for the closure means, means for operatively expanding the packing and yieldingly projecting the closure means so as to tend to maintain the friction drive, a stationary abutment, circumferentially spaced stops on the closure means adapted to respectively engage the abutment in accordance with the direction of rotation of the container so as to arrest rotation of the closure means responsive to yielding of the friction drive, the parts being so arranged that continued rotation of the container with relation to the arrested closure means successively alines the inlet ports with the control port as the conduit which communicates with each inlet port passes through the sector at which material collects, and means for supplying fluid via the control port to each inlet port while alined therewith.

2. In combination, a container rotatable on a substantially horizontal axis and adapted for reversal of its direction of rotation so that material in the container collects in the lower portion thereof at a sector which is fixed in space and which has its major portion at that side of the vertical axial plane which is in the direction of rotation of the lower portion of the container, means turning with the rotatable container for discharging fluid into the container, and means actuated responsive to change in direction of rotation of the container for opening communication with and supplying fluid to said discharge means while it passes through the sector at which material collects and closing communication with said discharge means while it passes through the remainder of the circumference of rotation.

3. In combination, a container rotatable on a substantially horizontal axis and adapted for reversal of its direction of rotation, fluid discharge means in the container adjacent its periphery for engaging and tumbling material in the container responsive to rotation of the container so that the material collects in the lower portion of the container at a sector which is fixed in space and which has its major portion at that side of the vertical axial plane which is in the direction of rotation of the lower portion of the container, and means actuated responsive to change in direction of rotation of the container for opening communication with and supplying fluid to said discharge means while it passes through the sector at which material collects and closing communication with said discharge means while it passes through the remainder of the circumference of rotation.

4. In combination, a container adapted for rotation in either of opposite directions for tumbling material in the container so that depending upon the direction of rotation the material collects in different sectors of a circle which are fixed in space and concentric with the rotatable container, means turning with the rotatable container for discharging fluid into the container, said means having an inlet port, closure means for the inlet port having a control port, a yieldable friction drive for rotating the closure means for limited rotation in the same direction as the container, means for limiting rotation of the closure means after predetermined arc of rotation so as to arrest rotation of the closure means, responsive to yielding of the friction drive, the parts being so arranged that continued rotation of the container with relation to the arrested closure means alines the inlet port with the control port as the discharge means passes through the sector at which material collects, and means for supplying fluid via the control port to the inlet port while said ports are alined.

5. In combination, a container rotatable on a substantially horizonal axis, so that material in the container collects in the lower portion thereof at a sector which is fixed in space and which has its major portion at that side of the vertical axial plane which is in the direction of rotation of the lower portion of the container, means turning with the rotatable container for discharging fluid into the container, and closure means having a control port, the major portion of the area of which is at that side of said vertical axial plane which is in the direction of rotation of the lower portion of the container, for opening communication with and supplying fluid to said discharge means while it passes through the sector at which material collects and closing communication with said discharge means while it passes through the remainder of the circumference of rotation.

6. In combination, a container rotatable on a substantially horizontal axis and adapted for reversal of its direction of rotation so that material in the container collects in the lower portion thereof at a sector which is fixed in space and which has its major portion at that side of the vertical axial plane which is in the direction of rotation of the lower portion of the container, means turning with the rotatable container for discharging fluid into the container, said means having an inlet port, a closure means for the inlet port having a control port, a yieldable friction drive for rotating the closure means for limited rotation in the same direction as the container, packing for the closure means, means for operatively expanding the packing and yieldingly projecting the closure means so as to tend to maintain the friction drive, means for limiting rotation of the closure means to a predetermined arc of rotation in accordance with the direction of rotation of the container so as to arrest rotation of the closure means responsive to yielding of the friction drive, the parts being so arranged that continued rotation of the container with relation to the arrested closure means alines the inlet port with the control port as the discharge means passes through the sector at which material collects, and means for supplying fluid via the control port to the inlet port when alined therewith.

7. In combination, a container rotatable on a substantially horizontal axis and adapted for reversal of its direction of rotation so that material in the container collects in the lower portion thereof at a sector which is fixed in space and which has its major portion at that side of the vertical axial plane which is in the direction of rotation of the lower portion of the container, means turning with the rotatable container for discharging fluid into the container, said means having an inlet port, a closure means for the inlet port having a control port, a yieldable friction drive for rotating the closure means for limited rotation in the same direction as the container, a stationary abutment, stops on the closure means adapted to respectively engage the abutment in accordance with the direction of rotation of the container so as to arrest rotation of the closure means after predetermined arc of rotation and responsive to yielding of the friction drive, the parts being so arranged that continued rotation of the container with relation to the arrested closure means alines the inlet port with the control port as the discharge means passes through the sector at which material collects, and means for supplying fluid via the control port to the inlet port when alined therewith.

8. In combination, a container adapted for rotation in either of opposite directions for tumbling material in the container so that depending upon the direction of rotation the tumbling material collects in the container in different sectors of a circle which are fixed in space and concentric with the rotatable container, fluid conducting means, and means movable in space for selective positioning in accordance with the respective opposite directions of rotation of the container for opening communication between the fluid conducting means and the interior of the container at that sector at which the tumbling material collects depending upon the direction of rotation of the container and closing communication between the fluid conducting means and the interior of the container throughout the remainder of the circle of which the said sector is a portion.

9. In combination, a container adapted for rotation for tumbling material in the container so that the tumbling material collects in the container in a sector of a circle which is fixed in space and concentric with the rotatable container and the arcuate position of which is determined by the direction of rotation of the container, fluid conducting means, and means providing communication between the fluid conducting means and the interior of the container at that sector at which the tumbling material collects as determined by the direction of rotation of the container and closing communication between the fluid conducting means and the interior of the container throughout the remainder of the circle of which the said sector is a portion.

10. In combination, a container adapted for rotation for tumbling material in the container so that the tumbling material collects in the container in a sector of a circle which is fixed in space and concentric with the rotatable container and the arcuate position of which is determined by the direction of rotation of the container, fluid conducting means, and means actuated dependently with inauguration of rotation of the container in a predetermined direction, for opening communication between the fluid conducting means and the interior of the container at that sector at which the tumbling material collects as determined by the direction of rotation of the container and closing communication between the fluid conducting means and the interior of the container throughout the remainder of the circle of which the said sector is a portion.

DAN McDONALD.